March 31, 1964     P. L. MAY ETAL     3,126,815
FABRICATED BALER NEEDLE
Filed Oct. 25, 1961
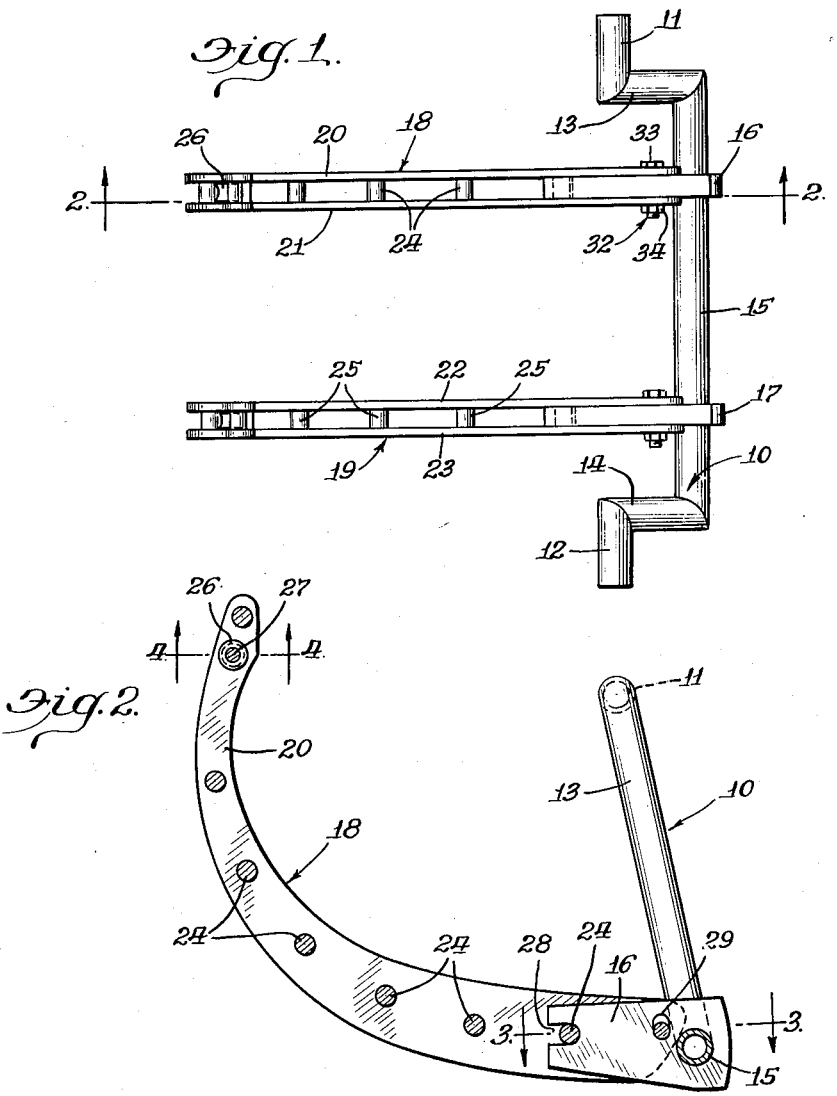
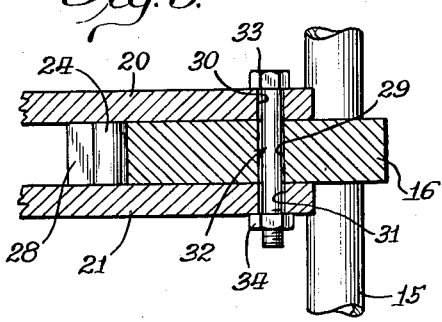
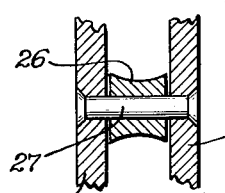
INVENTORS.
Patrick L. May
Ralph E. Beyer 3,126,815
FABRICATED BALER NEEDLE
Patrick L. May and Ralph E. Beyer, Memphis, Tenn., assignors to International Harvester Company, Chicago, Ill., a corporation of New Jersey
Filed Oct. 25, 1961, Ser. No. 147,685
9 Claims. (Cl. 100—24)

This invention relates to a new and improved fabricated baler needle.

Hay baler needles take much abuse and as a result have to be straightened or replaced quite frequently. Most needles used at the present time are castings which do not generally lend themselves to quick attachment or replacement in a baler.

A principal object of the present invention is to provide a fabricated baler needle.

An important object of this invention is the provision of a weld fabricated baler needle.

Another important object of this invention is to supply a quickly attachable needle for balers.

A further important object of this invention is to equip a baler needle with attachable means having arcuately adjustable means incorporated therein.

Another object is to reduce the weight of the needle.

Another important object of this invention is to provide a quickly attachable baler needle having a part thereof engageable with an open ended notch in a support and a spaced apart opening adapted for attachment to the support in a range of arcuate adjustments.

A still further important object of this invention is the provision of a weld fabricated baler needle consisting of spaced side plates and buttons included therebetween.

Another and still further important object of this invention is to provide a fabricated needle with spaced apart sheet metal side plates and button projections welded therebetween at spaced intervals.

Still another important object of this invention is to equip a fabricated baler needle with spaced apart side sheets, a strand roller journaled for rotation between the side sheets and cooperative support-engaging means mounted between the spaced apart side sheets at an end thereof opposite the roller mounting.

Other and further important objects and advantages will become apparent from the disclosures in the following specification and accompanying drawings.

In the drawings:

FIGURE 1 is a top plan view of the baler needles and drive crank of this invention.

FIGURE 2 is a sectional view taken on the line 2—2 of FIGURE 1.

FIGURE 3 is a sectional view taken on the line 3—3 of FIGURE 2.

FIGURE 4 is a sectional view taken on the line 4—4 of FIGURE 2.

As shown in the drawings:

The reference numeral 10 indicates generally a needle support in the form of a bail or U-shape. The support constitutes a crank which is driven to effect an arcuate swinging movement of the needles through a bale-forming chamber for the purpose of carrying a strand through the bale-forming chamber to a knotter or twisting mechanism on the opposite side. The present drawings depict only the needles and their crank support. For the purpose of understanding the full environment of these nedles in a hay baler, it is suggested that the patent to Crumb et al. 2,450,082 be examined. It is in that type of hay baler that the present fabricated needle is to be used.

The bail or U-shaped crank consists of spaced apart axially aligned shaft members 11 and 12. These shaft members 11 and 12 provide the journal mounting of the crank 10 within a supporting structure on a hay baler or the like (not shown). The needle crank support further includes side arms 13 and 14 which constitute the sides of the bail or U-shaped support member 10. A bottom 15 of the bail support 10 joins the side arms thus making for a unitary support including the axially aligned spaced shaft members 11 and 12, the spaced apart side arms 13 and 14, and the included bottom 15.

The shaftlike bottom member 15 is provided with fixed, spaced apart, generally parallel plates 16 and 17. Spaced apart strand-carrying needles 18 and 19 are adapted to be supported by the spaced apart generally parallel plates 16 and 17.

The needle 18 comprises spaced apart sheet metal plates 20 and 21 and similarly the needle 19 includes spaced apart sheet metal plates 22 and 23. Cylindrically-shaped spacers or buttons 24 are welded at intervals along the length of the needle 18 between the side plates 20 and 21 and perform the function of holding the side plates 20 and 21 in fixed spaced apart parallel relationship. Similarly cylindrically-shaped spacers 25 are welded at intervals along the length of the needle 19 between the side plates 22 and 23. Again it is these spacers welded between the plates that hold the plates in fixed spaced apart relationship to constitute a needle for carrying a strand of either twine or wire around bales of hay or the like.

As best shown in FIGURES 2 and 4, a strand-carrying roller 26 is journaled on a shaft 27 which is supported in the side plates 20 and 21 of the needle 18 near its upper end. Of course, the companion needle 19 is similarly constructed with a strand-carrying roller at its upper end. Inasmuch as the needles are identical, the detailed illustration of the second roller has not been shown.

As best shown in FIGURES 2 and 3, the plate 16 on bottom 15 is provided with a forwardly opening end notch 28. Spaced rearwardly of the open end notch 28 is a transversely disposed vertically elongated opening 29 through the plate 16. The needle 18 is provided with aligned holes 30 and 31 through the ends of its spaced apart side plates 20 and 21. As best shown in FIGURE 3 a bolt 32 having a head 33 is slidably engaged with the aligned openings 30 and 31 of the needle 18 and the intermediately included transversely disposed opening 29 of the plate 16. A nut 34 is adapted to engage the threaded end of the bolt 32 to thus draw the side plates 20 and 21 of the needle 18 against the intermediately disposed supporting plate 16 which as previously stated forms a part of the crank support of this invention. One of the welded spacers or buttons 24 disposed between the plates 20 and 21 is arranged and constructed to engage the open end notch 28 of the supporting plate 16. Thus the needle 18 is held firmly fixed to the plate 16 by the two-point engagement therewith. A single bolt 32 not only fastens the needle 18 to the plate 16 but also permits some arcuate adjustment of the needle relative to the plate 16 by rocking the needle about the spacer 24 thus moving the position of the bolt 32 to some location intermediate the top and bottom of the elongated slot 29 in the plate 16. When the desired position of angular adjustment of the needle is obtained the nut 34 is drawn up tightly thereby holding the needle in its adjusted position. This, of course, also bars removal of the needle from the plate 16 by reason of the bolt and the spaced apart engagement of the spacer 24 with the open end notch 28. The companion needle 19 is constructed identically to that of the needle 18, and the details will not be duplicated herein.

There is thus provided in this invention a fabricated baler needle consisting of spaced apart plates preformed in the shape of a baler needle and held in spaced apart relationship by a plurality of buttons or spacers welded between the side plates at intervals along the length thereof. The spaced apart plates conveniently provide a location for a strand-carrying roller adjacent one end of the needle and the omission of a spacer at the extreme other end of the needle facilitates the employment of a removable bolt to permit engagement of the needle to a supporting plate. The bolt is merely passed through aligned openings in the needle side plates and through an elongated opening in the intermediately positioned supporting plate. Further, the supporting plate is provided with a spaced apart end-opening notch to slidably receive a spacer 24. Thus the needles may be readily attached to the supporting plates merely by sliding a spacer into the open end notch and thereafter passing a bolt transversely through the aligned openings in the needle side plates and through the intermediately disposed supporting plate. As previously stated, the elongated opening in the supporting plate provides for arcuate adjustment of the needle as desired.

We are aware that numerous details of construction may be varied throughout a wide range without departing from the principles disclosed herein and we therefore do not propose limiting the patent granted thereon otherwise than as indicated by the appended claims.

What is claimed is:

1. A strand-carrying needle assembly for balers, comprising; a plate having a transverse opening therethrough and an open end notch spaced from said opening, the sides of said notch being substantially normal to the sides of said transverse opening, a needle having parallel arms, spacers located at equal intervals between said parallel arms to hold said arms in parallel relationship, the distance between the center of said transverse opening and the center of the bottom of said notch being substantially equal to one of said equal intervals, said arms having aligned apertures at one end thereof, said spacers having a width slightly greater than the thickness of said plate, one of said spacers removably engaging said open end notch, said aligned apertures arranged for alignment with said transverse opening when said one spacer is in engagement with the open end notch and the parallel arms flank the plate, and removable fastener means for passing through said aligned apertures and said transverse opening to hold said assembly together.

2. A needle assembly as set forth in claim 1 in which said transverse opening is an elongated slot whereby the strand-carrying needle may be arcuately adjusted relative to said plate.

3. A needle assembly as set forth in claim 1 in which said spacers are cylindrically shaped.

4. A needle assembly as set forth in claim 1 in which said removable fastener means is a bolt and nut.

5. A fabricated baler needle assembly comprising:
   (a) a plate support, said plate support having
      (1) transverse aperture means and an
      (2) open end notch spaced from said aperture means, the sides of said notch being substantially normal to the sides of said transverse opening,
   (b) spaced apart parallel arms for removable attachment to said plate support, having
      (1) transversely aligned apertures at one end thereof,
      (2) removable fastening means for passing through said transversely aligned apertures,
   (c) spacer means mounted between said parallel arms at intervals along the length thereof,
   (d) the longitudinal spacing between the last of said spacer means at the end of said parallel arms adjacent said transversely aligned apertures being substantially equal to the longitudinal spacing between said transverse aperture means and said open end notch, whereby the spaced apart parallel arms are removably fastened to said plate support by said last spacer means engaging said open end notch and the transversely aligned apertures being in alignment with the transverse aperture means, the removable fastening means passing through both the intermediately disposed plate support and said transversely aligned apertures.

6. A needle assembly as set forth in claim 5 in which:
said spacer means includes cylindrical button members weldably attached between said spaced apart parallel arms.

7. A needle assembly as set forth in claim 5 in which:
said transverse aperture means includes an elongated slot.

8. A needle assembly as set forth in claim 5 in which:
said removable fastening means includes a bolt and nut.

9. For use in a baler having a crank member which is displaced during each operating cycle, a needle assembly comprising a support plate having first and second end portions, one end portion of the support plate being affixed to said crank and the other end portion of said plate defining a slot therein, and the intermediate portion of said support plate defining a guide aperture therein, a pair of needle arms spaced apart by means including at least one spacer dimensioned for entry into said slot, each needle arm defining an indexing aperture near one end thereof in alignment with the corresponding indexing aperture in the other of said arms, which indexing apertures are spaced from said spacer by a distance related to the distance between said slot and said guide aperture in the support plate, said arms being spaced apart by a distance only slightly greater than the width of said plate whereupon assembly of said arms to flank the plate with the spacer in said slot effectively restrains displacement of the needle arms in a direction substantially normal to the plane of said plate, and coupling means for passing through said guide aperture in the plate and each of said indexing apertures in said arms to thereby obviate displacement of said arms in a direction substantially parallel to the plane of said plate.

References Cited in the file of this patent
UNITED STATES PATENTS

| | | |
|---|---|---|
| 2,649,043 | Jones et al. | Aug. 18, 1953 |
| 2,733,652 | Dwyer | Feb. 7, 1956 |
| 2,770,184 | Smith | Nov. 13, 1956 |
| 2,882,813 | Nelson et al. | Apr. 21, 1959 |
| 2,991,097 | Vanwersch et al. | July 4, 1961 |